June 30, 1942.  W. A. RAY  2,288,300
CONTROL MECHANISM
Filed Jan. 13, 1941   3 Sheets-Sheet 3
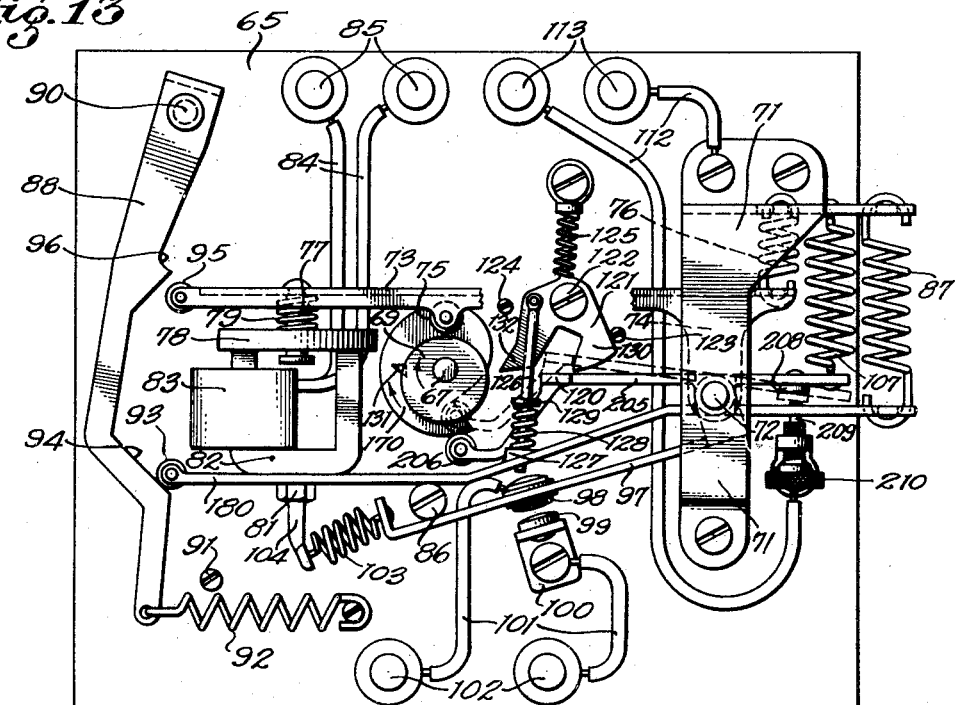
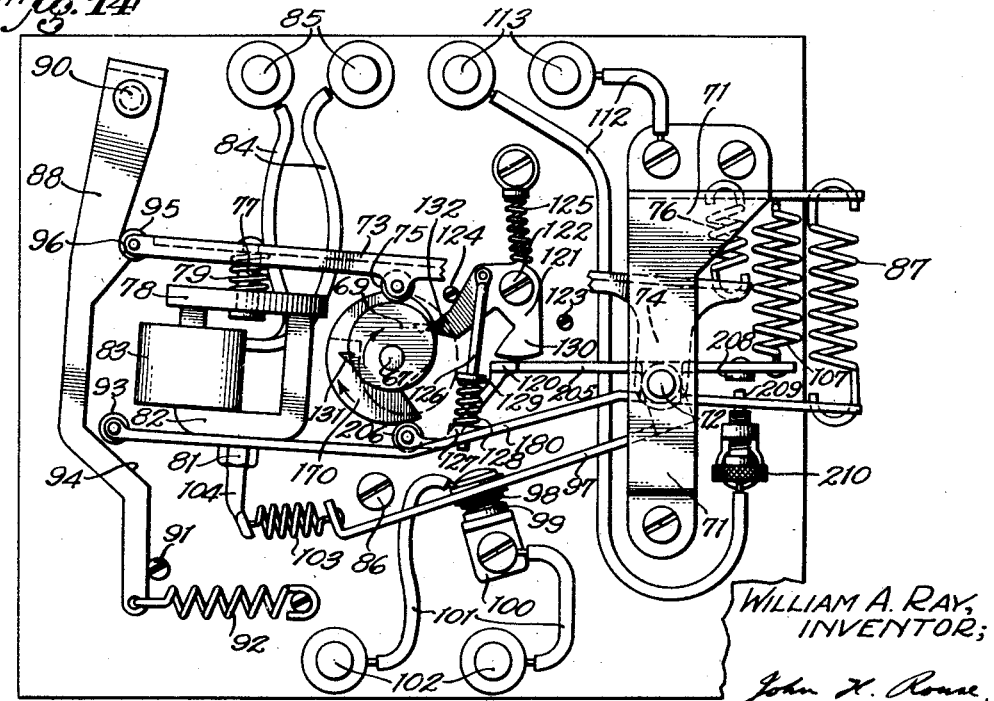
WILLIAM A. RAY, INVENTOR;
ATTORNEY.

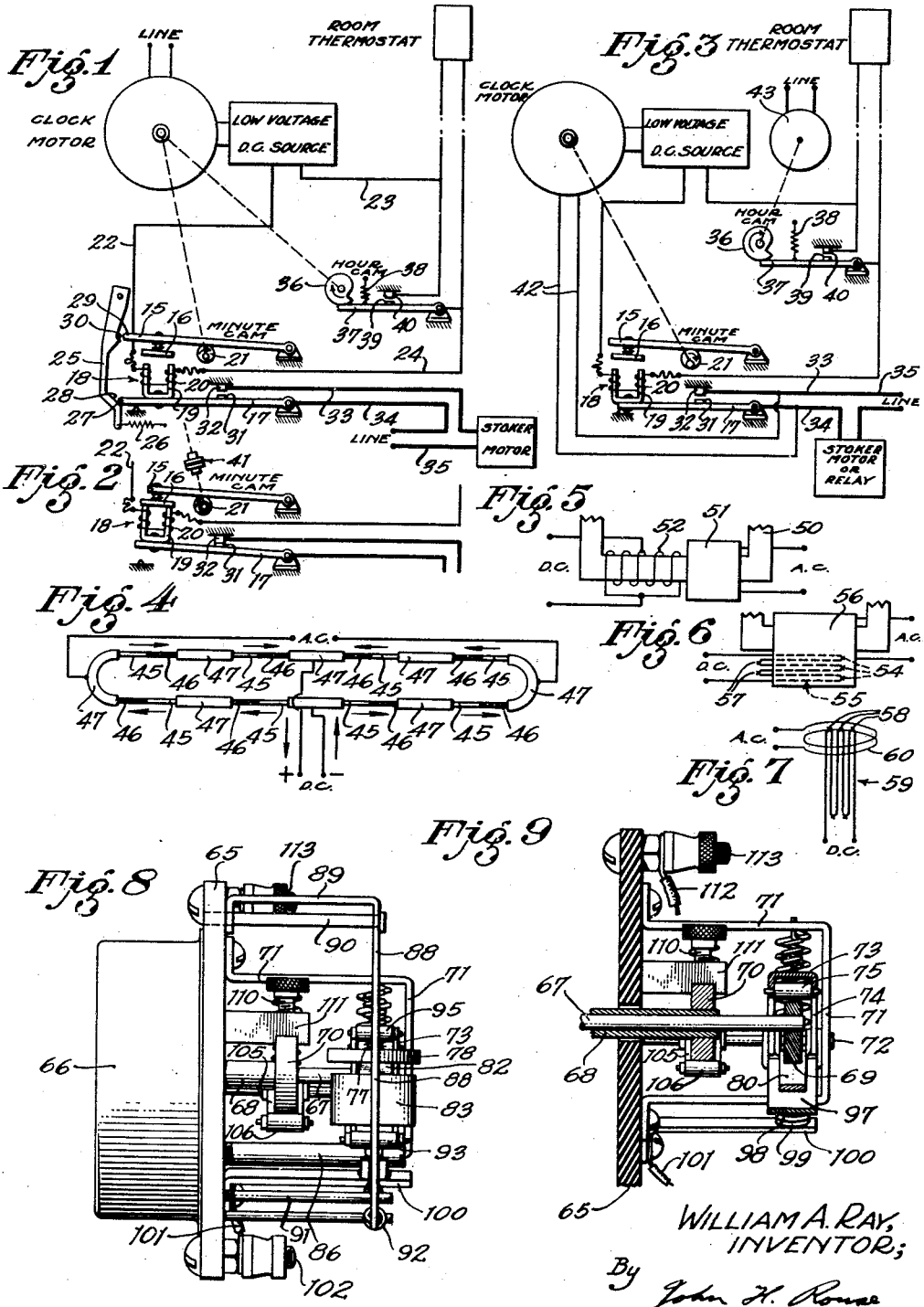
June 30, 1942.  W. A. RAY  2,288,300
CONTROL MECHANISM
Filed Jan. 13, 1941  3 Sheets-Sheet 1
WILLIAM A. RAY,
INVENTOR;
By John H. Rouse,
ATTORNEY.

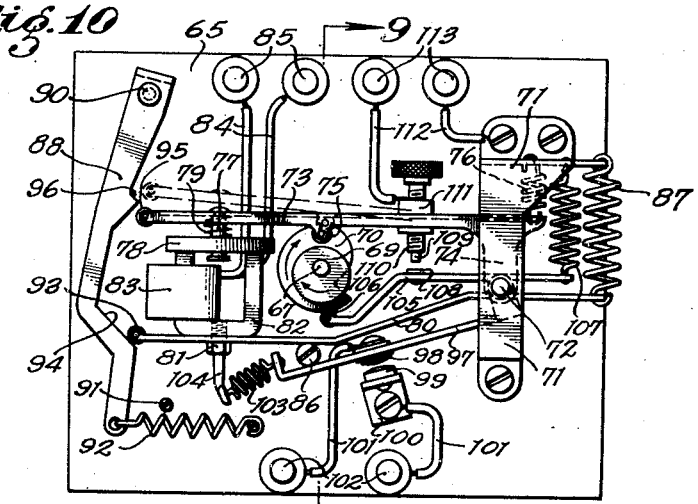

Patented June 30, 1942

2,288,300

UNITED STATES PATENT OFFICE 2,288,300

CONTROL MECHANISM

William A. Ray, Glendale, Calif.

Application January 13, 1941, Serial No. 374,303

7 Claims. (Cl. 200—33)

My present invention relates to control mechanisms and more particularly to a mechanism for controlling automatic coal stokers.

A general object of my invention is to provide means for periodically operating the stoker so as to maintain the fire, as well as means for operating the stoker automatically in accordance with the heating requirements.

Another object is to provide oscillating means which is effective to operate switching means for the stoker only when a predetermined condition exists, and means for rendering the oscillating means ineffective when the switching means has been operated and while the condition still exists.

Another object is the provision of means for controlling the operation of the stoker, which means are energizable by a minute amount of electric power, such as that produced by an ordinary thermocouple, so that simple "floating" contact actuating means may be employed in the control circuit.

Another object is to provide means associated with the control device for generating the power required for its energization.

Another object is the provision of simple and effective means for varying the duration of the periodic operation of the stoker.

Another object is the provision of means for preventing over-stoking of the furnace, which means is effective to prevent a periodic operation of the stoker in the event that the same has been automatically operated in accordance with the heating requirements during the interval preceding that period.

Other objects and advantages of the invention will be found in the description, the drawings, and the appended claims.

For complete understanding of the invention, reference may be had to the following detailed description and accompanying drawings, wherein:

Figure 1 is a diagrammatic view of a stoker control system embodying my invention;

Figure 2 is a fragmentary view of a modified arrangement of the system shown in Fig. 1;

Figure 3 is a diagrammatic view of a still further modified stoker control system embodying my invention;

Figures 4, 5, 6 and 7 are diagrammatic views of different means for providing the low voltage source of direct current indicated by the rectangle and legend in Figs. 1 and 3;

Figure 8 is an end elevation of a practical embodiment of the control device shown in Fig. 1;

Figure 9 is a fragmentary sectional view of the device shown in Fig. 8, taken along the line 9—9 of Fig. 10;

Figures 10, 11 and 12 are similar front elevations of the device of Fig. 8, the parts being shown in the figures in various positions which they assume in operation; and Figures 13 and 14 are similar front elevations, showing the parts in moved positions, of a modified form of the device shown in Figs. 8–12.

Referring first to Fig. 1 of the drawings, the numeral 15 indicates a first movable member or pivoted arm which carries on the underside of its free end a loosely mounted armature 16. A second movable member or pivoted arm 17 carries on its free end an electromagnet generally indicated at 18 and comprising a U-shaped core 19 and an energizing winding or coil 20. A cam 21, driven at a constant speed of, say, one revolution per minute by an electric clock motor indicated by the legend, moves the first arm 15, which is gravity biased, toward and away from the second arm 17 so that the armature 16 in its downward movement periodically engages the pole faces of the core 19. The coil 20 is connected by wires 22, 23 and 24 in series with a source of low voltage direct current and a thermostat responsive to the temperature of the space heated by the stoker, both of these devices being indicated by legends. If the electromagnet 18 is unenergized, the periodic movement of arm 15 has no effect on arm 17. If however, when the armature engages the core, the coil circuit is complete through the thermostat, upon subsequent upward movement of arm 15 the second arm 17 is moved therewith the armature being magnetically held to the core.

The amount of electrical energy required to magnetically hold the armature in engagement with the core against the gravity bias of arm 17 is very small, being in a practical embodiment of the device in the order of one milliwatt. With such a small amount of power it is not possible to magnetically move the parts through space and such action is not proposed. It is first necessary to bring the armature mechanically into close engagement with the core and for this reason the armature is loosely mounted on the arm so that its surface is free to adjust itself to that of the core.

A latch member 25, pivoted at its upper end and inwardly biased by a tension spring 26 connected to its lower end, is normally held in the inoperative position shown by the engagement of an extended end portion 27 of arm 17 with an inclined surface 28 of the latch member, the weight of arm 17 and the electromagnet 18 overcoming the force of spring 26. When, the electromagnet being energized, both arms 15 and 17 are simultaneously lifted by the cam 21, the latch member is free to move inwardly so that when arm 15 is in its uppermost position the extended portion 29 of this arm drops into a notch 30 formed in the latch member and its subsequent downward movement is thus arrested while the cam continues to rotate. Carried by arm 17 is a contact element 31 which, in the raised position of this arm, engages a fixed contact element 32, thereby connecting by wires 33, 34 and 35 a stoker motor in circuit with the power line, as indicated by the legends, to operate the stoker.

Arm 17 remains in its raised position, closing the stoker motor contacts, until electromagnet 18 is deenergized by opening of the thermostat contacts, due to increase in room temperature, whereupon arm 17 falls by gravity, opening the stoker motor circuit and, by the impingement of its end portion 27 on the inclined surface 28 of the latch member, tripping the latch so that arm 15 is again free to move under the influence of cam 21.

Also driven by the clock motor, at a speed of, say, one revolution per hour, is a cam 36 against the surface of which the free end of a pivoted arm 37 is urged by a tension spring 38. Connected in parallel with the thermostat contacts is a movable contact 39 carried by arm 37 and a fixed contact 40. As the cam 36 rotates it reaches a position in which arm 37 is free to move upward toward the cut-away portion of the cam, thus closing contacts 39 and 40. This has the same effect as closing the thermostat contacts and consequently when armature 16 is subsequently brought into engagement with the electromagnet core by the movement of cam 21, the stoker control system is operated as hereinabove described. Thus the stoker is periodically operated, regardless of the heating requirements, to prevent dying-out of the fire. The duration of the period in which contacts 39 and 40 remain closed is determined by the shape of the cam.

In Fig. 2, modified means are disclosed for retaining arms 15 and 17 in the positions to which they are raised by cam 21 when the electromagnet is energized. The latch member is omitted and a slip-clutch 41 is provided between the clock motor and cam 21. This clutch is so adjusted that sufficient power is transmitted to cam 21 to enable it to lift the arms, but when additional load is put on the cam by the engagement of contacts 31 and 32, movement of the cam is arrested while slippage of the clutch permits continued rotation of the clock motor shaft. Thus the parts remain in the positions shown until deenergization of the electromagnet permits arm 17 to drop, whereupon cam 21 is again rotated through the slip-clutch. A similar effect could also be produced by omitting the slip-clutch and providing a clock motor of such limited power that it would "stall" when movement of the arms was arrested by engagement of the stoker motor contacts.

In Fig. 3 I have shown still further modified means for arresting the movement of the control members when contacts 31 and 32 engage. The clock motor, instead of being connected directly to the power line as in Fig. 1, is connected by wires 42 in parallel with the stoker motor contacts. When these contacts are disengaged, the clock motor is thus connected to the line in series with the stoker motor. The electrical resistance of a relatively powerful motor such as is capable of operating a stoker is very low with respect to that of a clock-type motor and therefore the voltage across the clock motor is high enough to operate it at normal speed. For the same reason, the voltage across the stoker motor when it is in series with the clock motor is so low that the stoker motor is not operated. When, upon energization of the electromagnet, arm 17 is raised so that the stoker motor contacts engage, the clock motor is stopped, its circuit being shorted by the contacts. Thus the parts remain in contact-closing position until deenergization of the electromagnet permits arm 17 to drop, whereupon operation of the clock motor is resumed. Under some conditions, a suitable low-resistance relay may preferably be connected in series with the clock motor and the line in place of the stoker motor itself, the relay in turn controlling the stoker motor. If periodic stoking, independent of the thermostatic control, is required, the periodic or "hour" cam is driven by a separate motor 43 connected directly to the power line, as shown. A result similar to that produced in the system of Fig. 3 can also be produced by connecting the clock motor to the power line through a normally-closed switch which is operated to open position by the movement of arm 17 to stop the clock motor when this arm is in stoker-motor-contact-closing position.

While any source of electric power may be employed for the energization of the electromagnet 18 shown in the systems of Figs. 1, 2 and 3, I have found that it is preferable to employ a source of low-voltage direct current, for the reason that there is then no appreciable arcing at the thermostat or periodic contacts and consequently simple "floating" contact actuating means, whereby the contacts are gradually brought into engagement or separated, may satisfactorily be employed. I have therefore shown in Figs. 4–7 suitable means for generating such electric power. It is to be borne in mind that, as was pointed out hereinabove, the power required for the energization of the electromagnet is only in the order of one milliwatt.

In Fig. 4 is shown a thermocouple "ring" comprising a plurality of pairs of thermocouple elements 45 and 46 of dissimilar metals or alloys interconnected at their "cold junction" ends by relatively massive elements 47 of metal having high heat conductivity and low electrical resistance, such as copper. A source of alternating current is connected to points of the ring about which the numbers of pairs of thermocouple elements are equally arranged, the alternating current passing through the parallel branches of the ring and thus heating the thermocouple elements 45 and 46 which offer greater resistance to current flow on account of their smaller size and greater specific resistance than do the copper elements 47. The elements 45 and 46 may preferably be of such alloys as "Copel" and "Chromel," respectively. The adjoining ends, or hot junctions, of elements 45 and 46 are thus at a higher temperature than the opposite, or cold junction, ends of these elements which are connected to the relatively cool copper elements 47 and consequently current is generated which tends to flow in the direction of the arrows, element 46 of "Chromel" being thermoelectrically positive. Connections for utilizing the generated direct current are made to the ring at opposite points of the branches equally spaced from the points at which the alternating current is connected. The direct current connection points thus being of equal alternating potential, no alternating current can flow in the direct current leads. The groups of series-connected thermocouples on opposite sides of the direct current connection points are in opposed relation and therefore no direct current flows in the ring until a load is connected to the direct current output leads, whereupon the generated current flows equally through the right and left hand portions of the ring, as indicated by the arrows. Any even number of pairs of thermocouples may be provided in these portions as long as the proper alternating current and direct current balances are maintained. The thermocouple ring may conveniently be housed in a receptacle adjacent the clock motor and connected to the alternating current line which supplies the clock motor.

In Fig. 5, the numeral 50 indicates the core of an electric motor, such as the clock motor shown in Figs. 1 and 3, surrounding a portion of which is an energizing coil 51. Upon another portion of the core is a winding 52 consisting of a thermocouple ring similar to that shown in Fig. 4 and described above. In this arrangement, instead of connecting the ring directly to a source of alternating current, the current is electromagnetically induced in the ring by the alternating flux produced in the core.

In Fig. 6, the hot junction portions 54 of a thermopile 55 are buried in the windings of the clock motor coil 56 which coil is designed to operate at a relatively high temperature, the cold junctions 57 being extended to the atmosphere. The elements of this thermopile may preferably be of materials wherein a relatively large amount of current is generated with small difference of junction temperature, such as bismuth and antimony.

In Fig. 7, the hot junctions 58 of a thermopile 59 are surrounded by a heating coil 60 which may be connected to the alternating current line.

Referring now to the practical embodiment of my invention shown in Figs. 8–12, the numeral 65 indicates a base of insulating material, on the back of which is mounted an electrically operated motor 66, preferably of the synchronous clock type. Driven by this motor and extending to the front of the base through an opening therein is a shaft 67 rotating in a hollow shaft 68. The speeds of shafts 67 and 68 may conveniently be one revolution per minute, and one revolution per hour, respectively. Secured to shaft 67 is an excentric cam 69, and to the hollow shaft 68 is a stepped cam 70.

Secured to the front surface of the base 65 is a U-shaped bracket 71 which provides support for the outer end of a rod 72, the inner end of which is threaded in the base. A first member or channeled arm 73, having at one end a pair of spaced dependent ear portions 74, is pivoted by these portions on rod 72. This arm is provided intermediate its ends with a roller 75 which is normally held in engagement with the surface of cam 69 by a spring 76 tensioned between the arm and bracket 71. Riveted to an outer portion of arm 73 is a pin 77 upon which is freely slidable a disk-shaped armature 78 which is urged away from the arm by a spring 79, the headed-over lower end of the pin limiting its downward movement.

Also pivoted on rod 72 is a second member or channeled arm 80 on which is rigidly mounted, by a screw 81, a U-shaped electromagnet core 82 which carries on one of its arms an energizing coil 83, the flexible leads 84 of which are connected to terminals 85. This arm is downwardly biased into engagement with a stop pin 86 by a spring 87 tensioned between an extended portion of the arm and the bracket 71.

By the rotation of cam 69, arm 73 is moved alternately toward and away from arm 80. When arm 73 is in its downmost position, armature 78 rests in engagement with the pole faces of core 82, as shown in Fig. 10, spring 79 being slightly compressed. The armature being free to rock slightly on pin 79, accurate alignment of the contacting surfaces of the armature and the core is thus permitted. The upmost moved position of arm 73 is indicated in broken lines in Fig. 10. If core 82 is energized by passage of current through coil 83, after engagement of the armature with the core, subsequent upward movement of arm 73 carries arm 80 also upward, the armature being magnetically held to the core. As has previously been mentioned in connection with the diagrams of Figs. 1–3, magnetic attraction through space of the parts of the electromagnetic system is not proposed.

A latch member 88 having an inwardly bent U-shaped upper end portion 89 (Fig. 8) is pivoted by this portion in spaced relation to the base on a pin 90 secured in the base. Connected to the lower end of this member and urging it into engagement with a stop pin 91 is a spring 92. The latch member is normally held in the inactive position shown in Figs. 10 and 11 by the engagement of a roller 93, mounted on the free end of arm 80, with an inclined surface 94 of this member. When arm 80 is raised, the latch member is permitted to move inwardly under the force of spring 92, so that when arm 73 reaches its upmost raised position, a roller 95 mounted on the end of this arm drops into a notch 96 formed in an upper portion of the latch member. Thus arm 73, and along with it arm 80, is held in the raised position as cam 69 rotates, the arms remaining in their raised positions until current through the electromagnetic coil is interrupted, whereupon arm 80 falls under the force of spring 87, roller 93 in this movement impinging on the inclined surface 94 of the latch member and forcing the same outward so that arm 73 is again free to move under the influence of cam 69.

Also pivoted at one end on rod 72 is an arm 97 upon which is insulatingly mounted a contact element 98 cooperable with a fixed contact element 99 mounted on a bracket 100 attached to the base. These contact elements, which serve to control operation of the stoker motor, are connected by wires 101 to terminals 102. The free end of arm 97 is upwardly bent and provided with a depression for receiving one end of a compression spring 103, the other end of which rests in a depression formed in a downwardly extending portion 104 of screw 81. When arm 80 is raised, the resultant movement of spring 103 produces a force on arm 97 which, when these parts have moved "off center," imparts a snap-action to arm 97, bringing contacts 98 and 99 into sudden engagement. A corresponding snap-action is also imparted to arm 97 to open the contacts in the downward movement of arm 80, movement of arm 97 in this direction being limited by its engagement with the stop pin 86.

Another arm 105, also pivoted at one end on rod 72, carries on its downwardly bent end portion a roller 106 which normally rides on the surface of the stepped cam 70, the arm being urged to this position by a spring 107 compressed between an extended portion of the arm and the bracket 71. Mounted on an intermediate portion of arm 105 is a contact element 108 which is cooperable with a relatively fixed contact element 109 carried on the lower end of an adjusting screw 110 threaded in a bracket 111 attached to the base. Wires 112, respectively attached to brackets 71 and 111, provide means for electrically connecting contacts 108 and 109 to terminals 113.

When the position of the stepped cam 70 is such that roller 106 rests on the concentric portion of this cam, contacts 108 and 109 are held out of engagement. As cam 70 rotates, a point is reached at which roller 106 is free to move upward toward the cut-away or stepped portion of the cam, thereby closing contacts 108 and 109. As was described in connection with Fig. 1, these contacts are in parallel with the switching device or thermostat which also controls the energization of the electromagnet. The time during which these contacts remain in engagement is determined by the adjusted position of screw 110, which screw controls the extent of movement of roller 106 toward the cut-away portion of the cam, the portion shown being so shaped that the contacts will be moved out of engagement in from one to fifteen minutes depending upon the adjusted initial raised position of the periodic contact arm 105, it being assumed that the cam 70 is driven at a speed of one revolution per hour.

In Fig. 10, the parts are shown in the positions reached when cam 69 is in its lowermost position, contacts 108 and 109 being held out of engagement by the stepped cam. In Fig. 11 roller 106 has just been raised in toward the cut-away portion of cam 70, thereby closing contacts 108 and 109 with the result that, the electromagnet thus being energized, arm 80 will also be raised by the continued movement of cam 69, thereby closing the stoker motor contacts. In Fig. 12, the parts are shown in their "latched" positions, the electromagnet being energized. It is believed that the operation of the control device shown in Figs. 8 to 12 will now be clear in view of the description of the corresponding device diagrammatically shown in Fig. 1.

In the modified form of the invention shown in Figs. 13 and 14, means have been added to the structure shown in Figs. 8–12 whereby a periodic operation of the stoker is prevented in the event that the same has been automatically operated in accordance with the heating requirements during a cycle preceding the normal period. The same numerals have been assigned to those parts which are identical with those shown in Figs. 8–12, the modified parts having been assigned numerals which are greater by 100 than those of the corresponding parts in Figs. 8–12.

The arm 205, actuated by the stepped cam 170, is provided with a frontwardly extending lug 120, cooperable with which is a pawl 121 pivoted on a screw 122 threaded in the base. Movement of the pawl is limited by stop pins 123 and 124, a spring 125 urging the pawl into either of these positions. For the actuation of the pawl there is provided a rod 126, pivoted at its upper end on the pawl and slidable at its lower end in an opening in a boss 127 formed on the upper surface of arm 180. A spring 128, compressed between the boss and an enlarged portion 129 of the rod, normally effects actuation of the pawl by movement of arm 180, but also permits upward movement of arm 180 when the pawl is held against movement under conditions to be described hereinafter.

If, while the arm 205, through its roller 206, is in engagement with the concentric surface of cam 170, arm 180 is moved upward, the pawl is thrown to the left (as shown in Fig. 14), its movement in this direction being unimpeded. The pawl will then remain in this position until it is returned to its original position shown in Fig. 13 by means hereinafter to be described. When cam 170 now reaches a position in which arm 205 would normally be free to move upward toward the stepped portion of cam 170, such movement is prevented by the engagement of the right-hand portion 130 of the pawl with the lug 120. Closure of contacts 208 and 209, which in this modification have been arranged below a right-hand extension of the arm, is thus prevented. If upward movement of arm 180 should now occur, it will have no effect upon the pawl.

Upon continued rotation of cam 170, a pin 131 secured to the front surface of this cam, engages the left-hand portion 132 of the pawl, and on further movement trips the pawl back to the position shown in Fig. 13. When this occurs, roller 206 is again in engagement with the concentric surface of cam 170 so that contacts 208 and 209 are open. It is thus seen that if arm 180, due to energization of the electromagnet, has been moved upward to close the stoker motor contacts at any part of the cycle previous to the normal periodic or hourly operation of the stoker, such operation is prevented and cannot occur until cam 170 has made a complete additional rotation.

In the event that the pawl has not been thrown to its locking position shown in Fig. 14 before cam 170 reaches the position at which periodic operation of the stoker is called for, arm 205 can rise to its contact-closing position shown in broken lines in Fig. 13, in which position the portion 130 of the pawl is below the lug 120. Thus, when arm 180 is now moved upward in response to the resultant closing of contacts 208 and 209, spring 128 is compressed since the pawl is held from movement by the engagement of its portion 130 with the lug 120. The additional downward pressure thus applied to arm 180 is not sufficient to hinder its magnetically-held upward movement, spring 128 being only stiff enough to trip the pawl when the same is free to move.

While I hade herein shown and described specific embodiments of my invention, I wish it to be understood that modifications may be made without departing from the spirit of the invention, and that I intend therefore to be limited only by the scope of the appended claims.

I claim as my invention:

1. In a control device: a first and a second independently movable member; means for periodically moving said first member in one direction toward said second member and in another direction away from it; said second member being biased away from said first member to a first position; means for causing said second member to be moved against the force of said bias to a second position along with said first member when the same is moved in said other direction, said last-named means comprising electromagnetic means associated with the members and effective only when the members are first brought into proximity with each other and the electromagnetic means is energized; means for preventing substantial subsequent movement of said first member by said periodic means when said second member is in said second position; and control means operated by the movement of said second member.

2. In a control device: a first and a second independently movable member; means for periodically moving said first member in one direction toward said second member and in another direction away from it; said second member being biased away from said first member to a first position; means for causing said second member to be moved against the force of said bias to a second position along with said first member when the same is moved in said other direction, said last-named means comprising electromagnetic means associated with the members and effective only when the members are first brought into proximity with each other and the electromagnetic means is energized; means operated in response to the combined movement of said members, in which movement said second member is moved to its second position, for preventing substantial subsequent movement of said first member by said periodic means; and control means operated by the movement of said second member.

3. In a control device: a first and a second independently movable member; electromagnetic means including a core element and an armature element, one of said elements being connected to said first member and the other to said second member; mechanical means for periodically moving said first member in one direction toward said second member, so that said elements engage each other, and in an opposite direction away from it; said core, when energized, being adapted to magnetically hold said armature when the elements are brought into engagement with each other so that by subsequent movement of said first member in said opposite direction said second member is moved therewith; means responsive to said movement of said second member for preventing subsequent movement of said first member in said one direction by said periodic means, whereby said second member is retained in moved position while said core is energized; means so biasing said second member that it is returned to its unmoved position upon deenergization of said core, thereby permitting resumption of movement of said first member; and control means operated by the movement of said second member.

4. In a control device: a first and a second independently movable member; electromagnetic means including a core element and an armature element, one of said elements being mounted on said first member and the other on said second member; continuously operated cam means for periodically moving said first member in one direction toward said second member, so that said elements engage each other, and in an opposite direction away from it; said core, when energized, being adapted to magnetically hold said armature when the elements are brought into engagement with each other so that by subsequent movement of said first member in said opposite direction said second member is moved therewith; latch means for retaining said first member in its oppositely moved position and effective only when said second member is then magnetically held in engagement with the first member; means so biasing said second member that it is returned to its unmoved position upon deenergization of said core, thereby rendering said latch means ineffective to prevent movement of said first member by said cam means; and control means operated by the movement of said second member.

5. In a control device: a first and a second independently movable member; electromagnetic means including a core element and an armature element, one of said elements being mounted on said first member and the other on said second member; continuously operated cam means for periodically moving said first member in one direction toward said second member, so that said elements engage each other, and in an opposite direction away from it; said core, when energized, being adapted to magnetically hold said armature when the elements are brought into engagement with each other so that by subsequent movement of said first member in said opposite direction said second member is moved therewith; a latch engageable with said first member when the same is in its oppositely moved position to prevent substantial subsequent movement thereof; means on said second member for holding said latch out of engagement with said first member and effective only when the second member is in its unmoved position; means biasing said second member to its unmoved position; and control means operated by the movement of said second member.

6. In a control device: a first and a second independently movable member; electromagnetic means including a core element and an armature element, one of said elements being mounted on said first member and the other on said second member; cam means for periodically moving said first member in one direction toward said second member, so that said elements engage each other, and in an opposite direction away from it; said core, when energized, being adapted to magnetically hold said armature when the elements are brought into engagement with each other so that by subsequent movement of said first member in said opposite direction said second member is moved therewith; a continuously operated motor; means, including a slip-clutch, connecting said motor to said cam means to normally drive the same, said slip-clutch permitting said cam means to stall when the same is subjected to a predetermined load; control means operated by the movement of said second member; and means biasing said second member to its normal unmoved position.

7. In a control device: a first and a second independently movable member; electromagnetic means including a core element and an armature element, one of said elements being mounted on said first member and the other on said second member; cam means for periodically moving said first member in one direction toward said second member, so that said elements engage each other, and in an opposite direction away from it; said core, when energized, being adapted to magnetically hold said armature when the elements are brought into engagement with each other so that by subsequent movement of said first member in said opposite direction said second member is moved therewith; an electrically operated motor for driving said cam means; means for deenergizing said motor when said second member reaches a predetermined moved position; control means operated by the movement of said second member; and means biasing said second member to its normal unmoved position.

WILLIAM A. RAY.